April 6, 1965   P. K. SCHILLING   3,177,278
METHOD OF FORMING CUP SHAPED BODIES
Filed Nov. 9, 1959   2 Sheets-Sheet 1
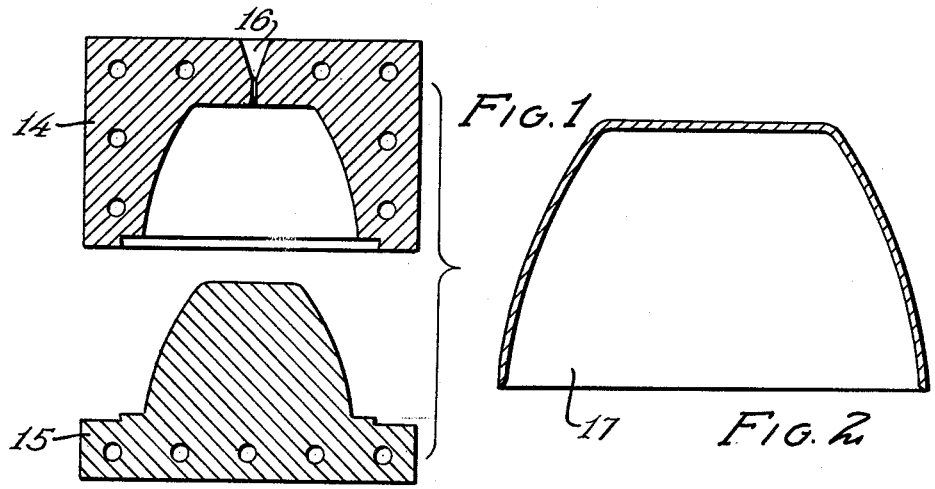
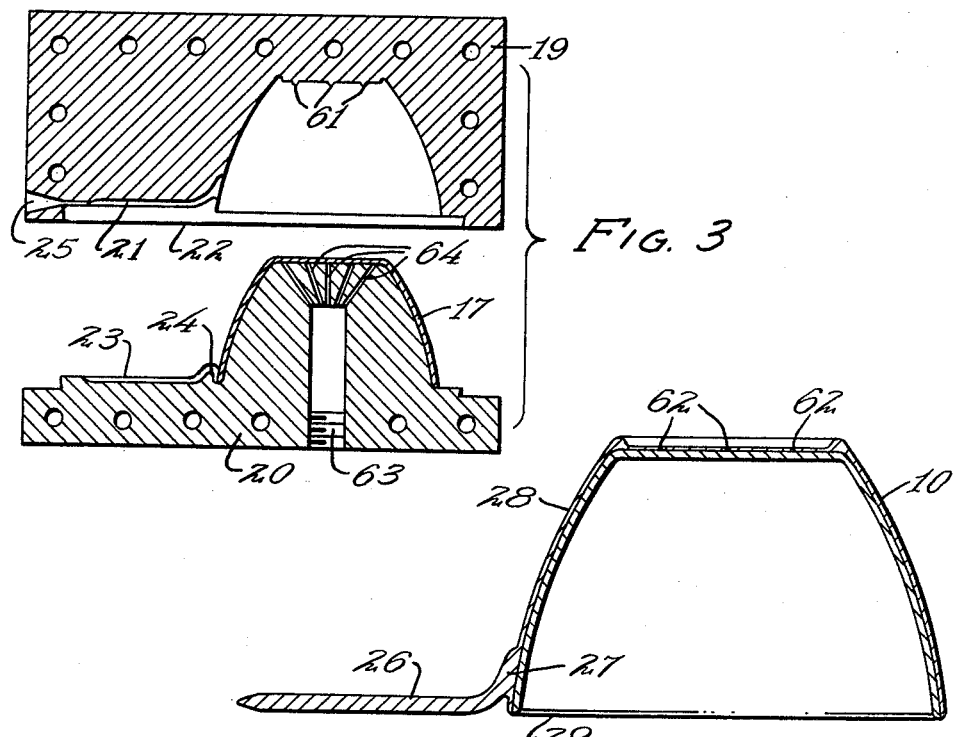
INVENTOR
Paul K. Schilling
BY Robert M. Dunning
ATTORNEY April 6, 1965 P. K. SCHILLING 3,177,278
METHOD OF FORMING CUP SHAPED BODIES
Filed Nov. 9, 1959 2 Sheets-Sheet 2

INVENTOR
Paul K. Schilling
BY Robert M. Dunning
ATTORNEY

United States Patent Office 3,177,278
Patented Apr. 6, 1965

3,177,278
METHOD OF FORMING CUP SHAPED BODIES
Paul K. Schilling, St. Paul, Minn., assignor to Plastics, Inc., St. Paul, Minn., a corporation of Minnesota
Filed Nov. 9, 1959, Ser. No. 851,710
4 Claims. (Cl. 264—255)

This invention relates to an improvement in method of forming cup shaped bodies and deals particularly with a method of forming bodies of the type described having curved finger engaging handles.

Various types of cup shaped bodies have been formed of plastic and similar material having attached handles which are curved to admit a finger to assist in the supporting of the cup. These cups have usually been formed in compound molds due to the fact that a female mold must be provided to form the outer surface, a male mold must be provided to form the inner surface, and the female mold must be axially split to permit the releasing of the handle from the mold. Not only are such molds expensive to produce and difficult to maintain, but the mold provides a rib of flashing extending diametrically through the center of the handle and the outer surface of the cup which must be removed before the cup is commercially salable. It is an object of the present invention to produce a cup of the type described without the necessity of providing a separable female mold thus eliminating most of the work in finishing the surface of the cup and removing the flashing therefrom and resulting in a cup having a smoother and more finished appearance.

A feature of the present invention resides in the provision of a mold capable of molding a cup shaped body into its proper form and having a handle strap extending a generally radial direction from the outer surface of the cup, preferably near the upper edge thereof. At the completion of the molding operation, the cup shaped bodies are removed from the mold while still in a thermoplastic state, and the cup is placed upon a suitable forming apparatus. This forming apparatus acts to bend the handle strap into its finished form before the temperature of the plastic material drops sufficiently to prevent such bending operation. The handle strap is retained in the forming device until the handle strap cools sufficiently to retain its shape, at which time, the cup may be removed from the mold.

A further feature of the present invention resides in the provision of an apparatus for forming cup shaped bodies which produce the finished cup and its properly shaped handle without producing flashing on any point on the cup body with the exception of the upper cup rim and the side edges of the handle. Due to the fact that the flashing along the upper rim of the cup may be readily removed by spinning the cup about its axis while engaged with an abrasive tool and as the flashing on the side edges of the handle may be readily removed by a light pressure of the handle against a suitable abrasive or buffing wheel, the cup may be finished more economically than when molded in the conventional manner.

A further feature of the present invention resides in the provision of a simple apparatus for accomplishing the desired result. Due to the fact that the handles must be bent while the plastic is still in a plastic state, the apparatus must of necessity be adapted to quickly receive the cups after the completion of the molding operation. The molding apparatus in preferred form comprises a platform on which the cups may be quickly inserted while still at an elevated temperature, with the handle straps extending below a handle molding projection. A plunger is provided above the body of the cup which acts to urge the cup against the platform and to move the handle strap against a roller which is resiliently supported for movement toward and away from the axis of the cup. As the plunger moves the platform past the roller, the handle is quickly rolled against the handle forming projection until the handle is completely formed. The cup is retained in this position until the temperature is lowered sufficiently to set the plastic. The plunger is then released, and the cup may be removed from the platform and replaced by another cup.

A further feature of the present invention resides in the fact that my method is particularly adapted to the molding of cups having inner and outer shells, usually of different color, to enhance the appearance of the finished product. In forming a cup of this type, a shell arranged to form the inner surface of the cup is first produced, this inner cup liner having no handle projection. The cup liner is then placed in a second mold and an outer layer of plastic is formed about the inner layer and welded securely thereto. The handle strap is formed integrally with the outer shell or layer. As a result, during the handle forming operation, the inner shell forms a firm support for the body of the cup to prevent any deformation thereof during the time the outer shell is still in a thermoplastic state.

A further feature of the present invention resides in the provision of a cup including a handle strap which is normally of greater cross sectional thickness than the adjoining portion of the cup being molded. Accordingly, the relatively thin shell forming the body of the cup will harden much more quickly than the handle strap, thus permitting the bending of the handle strap while the remainder of the shell being cast is relatively hard.

These and other objects and novel features of the present invention will be more clearly and fully set forth in the following specifications and claims.

In the drawings forming a part of the specification.

FIGURE 1 is a diagrammatic view showing a mold which may be employed for forming a cup lining shell.

FIGURE 2 is a sectional view through the shell formed by the die of FIGURE 1.

FIGURE 3 is a diagrammatic sectional view showing a mold for applying a layer of material to the shell FIGURE 4 is a cross sectional view of the cup formed by the die shown in FIGURE 3.

Figure 8:
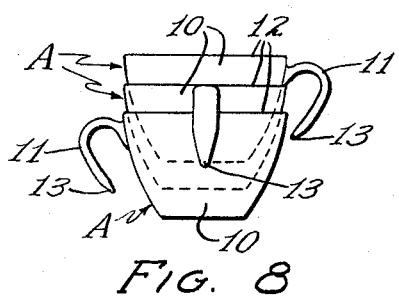
FIGURE 8 is a side elevational view of a plurality of formed cups in nested relation.

In order to understand the purpose of the described method and apparatus, reference is made to FIGURE 8 of the drawings. In this figure is shown three cups in nested relation. Each of the cups A include a tapered cup body 10 which is properly shaped so that one cup will nest within the other. Handles project from the walls of the cups, the handles being indicated in general by the numeral 11. The point of juncture between the handles 11 and the cup bodies 10 is preferably slightly below the level of the rim 12 of the cup and the handle curves upwardly to the plane of the upper rim. The handles are then rounded or looped so that the free ends 13 of the handles are directed toward the bases of the cup, the ends 13 terminating at a point spaced from the axis of each cup substantially equal the distance of the radius of the outer surface of the cup at its rim. As a result, the cups may rest in nested relation without interference by the cup handles and the ends of the handles may actually act to stabilize the nested cups and prevent relative tilting therebetween. The ends 13 of the handles are preferably tapered so as to enhance the appearance thereof.

In the preferred process, a mold of the type indicated diagrammatically in FIGURE 1 is first employed. The mold includes a female mold portion 14 and a male mold portion 15. A sprue passage 16 is provided through which thermoplastic compound may be injected. The mold is closed and held together and the thermoplastic material is injected into the mold under conditions of heat and pressure consistent with good molding practice, forming a cup liner shell which is preferably substantially thicker than the outer layer to be later applied.

The liner shell 17 is next preferably inserted in the mold diagrammatically illustrated in FIGURE 3 of the drawings. This mold comprises a female mold member 19 and a male mold member 20. The female mold cavity is substantially identical to the female mold cavity 14 but is slightly larger in dimension. Furthermore female mold 19 is provided with a groove 21 extending in a generally radial direction from the surface, the groove being of greater depth as indicated at 22 adjoining the inner surface of the mold so that the molded handle will be attached to the outer surface of the cup body at a point substantially spaced from a rim thereof and will provide a thickened handle area at this point. A sprue passage 25 is provided in the mold 19, preferably leading to the groove 21 as the handle is to be thicker than the remainder of the outer covering. The male mold 20 is of substantially equal dimension to the male mold 15 but also is provided with a radially extending groove 23 which terminates in an upward projection 24 adjoining the male portion of the mold so that the upper surface of the handle will be spaced below the rim of the cup where the handle adjoins the body of the cup.

In the second molding operation, the mold is closed and held under pressure while thermoplastic material is injected into the mold. The material injected flows through the sprue 25 and grooves 21, 22 and 23 and flows to form a thin film of plastic 28 covering the inner shell 17 and bonding securely with the liner shell 17. The plastic in the grooves 21, 22 and 23 form a generally radially extending handle strap 26 which subsequently forms the handle 11 of the cup 10 illustrated in FIGURE 8. In other words, the numeral 26 is used to designate the handle in flat form while the numeral 11 designates the handle in its finished loop shaped form.

Figure 7:
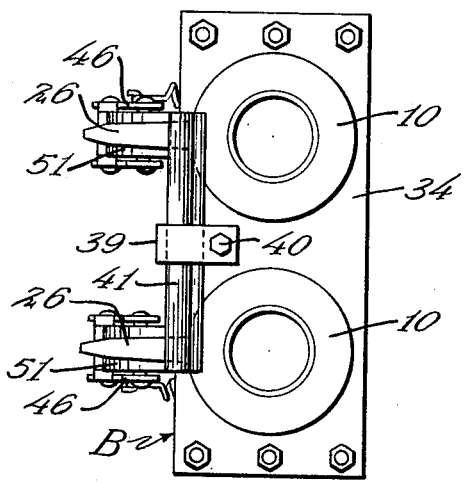
FIGURE 7 is a top plan view of the handle forming apparatus shown in FIGURES 5 and 6.
Figure 5:
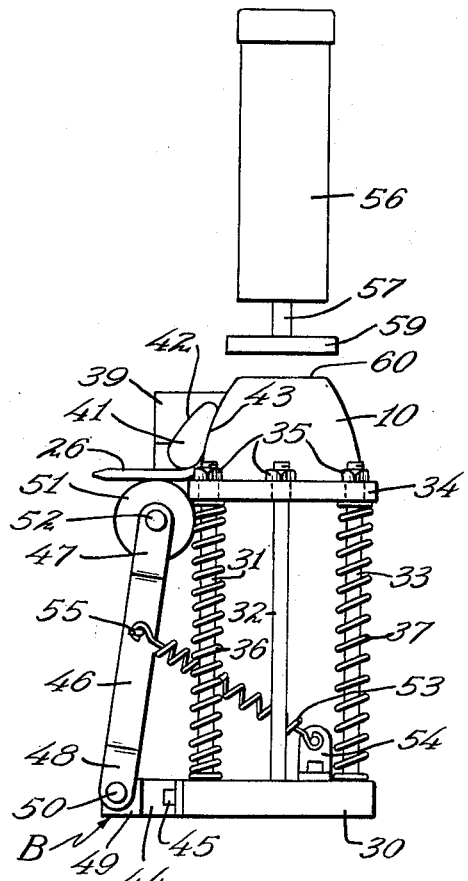
FIGURE 5 is a side elevational view of a handle forming apparatus.
Figure 6:
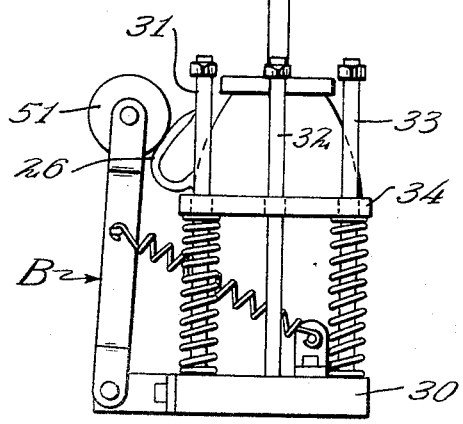
FIGURE 6 is a view similar to FIGURE 5 showing the apparatus in a different position.

After the cup 10 has been formed in the shape illustrated in FIGURE 4 of the drawings, the handle strap 26 is bent into curved form by the apparatus illustrated in FIGURES 5, 6 and 7 of the drawings. The apparatus is somewhat diagrammatically illustrated and the apparatus is shown as accommodating two cups in side by side relation as in the particular molding operation employed, two cups are simultaneously molded. Obviously, the same apparatus could be used to accommodate a single cup or could readily be modified to simultaneously form the handles of a larger number of cups.

The handle forming apparatus is indicated in general by the letter B and includes a base 30 of elongated form and generally rectangular in outline. Three guide rods 31, 32 and 33 extend upwardly in parallel relation from each end of the base 30. The three rods at each end of the base slidably support a platform 34. Nuts such as 35 at the end of the guide rod limit upward movement of the platform 34. Springs 36 and 37 encircling the guide rods 31 and 33 at the corners of the base 30 and platform 34 normally urge the platform 34 upwardly against the nuts 35. A bracket 39 is secured to the upper surface of the platform 34 in any suitable manner as by the bolt 40 and the bracket 39 acts to support a longitudinally extending handle molding bar 41. The handle molding bar 41 is preferably provided with a rounded contour 42 which is shaped similarly to the shape of the inner surface of the formed handle 11. The surface 43 of the molding projection or molding bar 41 is shaped to fit the contour of the cup 10 below the level of the handle 11.

A bracket 44 is secured to the base 30 by any suitable means such as by bolts 45 and acts to support a pair of similar arms 46. The lower end 48 of each arm is designed to straddle a projection 49 on the bracket 44 and to be pivotally connected thereto by means of a pivot 50. The upper ends 47 of the arms 46 are designed to straddle rollers 51 and are pivotally connected thereto by pivots 52. The pivots 50 and 52 are in parallel relation. A spring 53 is attached at one end to a bracket 54 mounted on the base 30 and the other end of each spring is connected at 55 to an intermediate point on the corresponding arm 46. The rollers 51 are thus urged into contact with the edge of the platform 34 with the upper surface of each roller at, or slightly below, the upper surface of the platform 34. The rollers 51 are also engageable with the handle straps of cups 10 as will now be described.

In the particular apparatus illustrated, two cups 10 are placed upon the platform 34 with their rims 29 in engagement with the platform and with the handle straps 26 extending beneath the handle forming projection 41. The handle straps 26 extend at substantially right angles to the longiutdinal axis of the platform 34. A hydraulic or pneumatically operated cylinder 56 is mounted above the platform 34 and includes a piston connected to a piston rod 57 supporting a pressure plate 59 which is of sufficient length to bridge the base ends 60 of the cups 10 while upon the platform 34. While the plastic forming the handle straps 26 is still in a flowable or plastic state, the cylinder 56 is actuated to lower the pressure plate 59 upon the upper ends of the cups. This action urges the cups into contact with the platform 34 and holds the cups from movement out of engagement with the concave surface 43 of molding projection 41.

As the platform 34 moves downwardly, the rollers 51 engage the handle straps 26 and fold these handle straps upwardly, curving them over the outer convex surface 42 of the handle forming bar 41. Due to the mounting in arrangement of the rollers 51, they are free to force the rollers about the convex surface 42 until they are in engagement with substantially the ends of the handle straps, or slightly beyond the position illustrated in FIGURE 6 of the drawings. During this action, the spring 53 tends to draw the rollers 51 against the handle straps sufficiently to bend them against the convex surface 42, thus shaping the handles.

Rollers 51 remain in engagement with the handle straps 26 until these handle straps have cooled below the setting temperature of the plastic. At this stage of the operation, the piston is retracted in cylinder 56 and the platform 34 is permitted to raise into the starting positions shown in FIGURE 5. The cups may be removed by sliding the handles from the ends of the forming bar 41 and the forming apparatus is set for another cycle of operation.

From the foregoing description it will be clear that I have provided a simple and effective method and apparatus forming cup shaped bodies which considerably simplifies the mold construction. Furthermore, the method can be carried out with relatively no waste of time due to the fact that the handles of the cups which have been previously molded can be bent during the following cycle of operation of the mold.

During the molding of the outer covering in the mold 19, 20, there is a tendency for the previously formed liner shell 17 to raise against the female mold when the plastic is injected through the handle forming grooves. This motion may be prevented by providing small projections 61, shown in exaggerated form in FIGURE 3, which bear against the shell 17 and hold it in place against the male mold. These projections form slight indentations in the base of the outer covering 28. These indentations are so small as to be virtually unnoticeable particularly as the indentations are in the bottom surface of the cup.

These projections 61 have been found to have an unusual advantage. Normally as the plastic is injected about the circumference of the cup from opposite sides thereof, the plastic joins opposite the handle portion to form a weld line. This weld line is discernible when light colored plastic material is injected, while being not particularly discernible in darker colored plastics. It has been found that when the projections 61 are in the mold, they create a ripple in the flow of plastic causing the weld line to be irregular or wavy in form. As a result, the strength of the weld is increased and the weld line cannot readily be detected.

If preferred, the male portion 20 of the mold may include a cavity 63 connected to the surface of the mold by small passages 64. A source of partial vacuum is connected to the cavity 63, holding the liner 17 against the male mold during the injection of the plastic covering.

In accordance with the patent statutes, I have described the principles of construction and operation of my improvement in method of forming cup shaped bodies, and while I have endeavored to set forth the best embodiment thereof, I desire to have it understood that changes may be made within the scope of the following claims without departing from the spirit of my invention.

I claim:
1. The method of producing a thermoplastic cup shaped article having an attached handle, the method consisting of forming a lining shell, molding an outer covering on said shell and simultaneously molding a substantially straight generally radially extending handle strap connected to said covering, molding the handle straps substantially thicker than said shell and covering, removing the composite shell, covering and handle strap from the mold and bending the handle into loop-shaped form while the handle strap but not the shell and covering is still in a plastic state.

2. The method of claim 1 and including the step of holding the handle strap in bent form until the handle strap cools below the temperature at which it is plastic.

3. The method of producing a plastic cup having an attached handle, the method consisting in molding the cup of thermoplastic resin powder, forming the handle strap of greater thickness than the cup body and extending substantially radially therefrom, removing the cup from the mold while the plastic in the handle strap is still in a pliable condition but after the cup body is relatively rigid, and bending the handle strap into a rounded shape while the handle but not the cup body is still in a plastic condition, there being a time lapse between the molding of the cup in the mold and the bending of the handle during which the thinner cup body goes through a greater change of temperature than the handle.

4. The method of claim 3 and including the step of holding the handle in rounded shape until the handle strap has cooled below the plastic temperature.

References Cited in the file of this patent

UNITED STATES PATENTS

| | | |
|---|---|---|
| 1,785,391 | Russell | Dec. 16, 1930 |
| 2,160,160 | Marinsky et al. | May 30, 1939 |
| 2,343,238 | Manning et al. | Mar. 7, 1944 |
| 2,377,393 | Wiley | June 5, 1945 |
| 2,413,823 | Gits | Jan. 7, 1947 |
| 2,431,353 | Warner et al. | Nov. 25, 1947 |
| 2,450,448 | Sawyer | Oct. 5, 1948 |
| 2,524,858 | Thomas | Oct. 10, 1950 |
| 2,531,299 | Sawyer | Nov. 21, 1950 |
| 2,590,221 | Stevens | Mar. 25, 1952 |
| 2,769,204 | Morin | Nov. 6, 1956 |
| 2,900,666 | Marcus | Aug. 25, 1959 |
| 3,057,016 | Schilling | Oct. 9, 1962 |

FOREIGN PATENTS

| | | |
|---|---|---|
| 466,239 | Great Britain | May 25, 1937 |
| 1,196,224 | France | May 25, 1959 |